US012790724B2

(12) United States Patent
Ku et al.

(10) Patent No.: US 12,790,724 B2
(45) Date of Patent: Nov. 10, 2026

(54) METHOD OF PREPARING CARBON COMPOSITE FIBER AND CARBON COMPOSITE FIBER

(71) Applicant: KOREA INSTITUTE OF SCIENCE AND TECHNOLOGY, Seoul (KR)

(72) Inventors: Bon-Cheol Ku, Wanju-gun (KR); Sung Yong Kim, Wanju-gun (KR); Seo Gyun Kim, Wanju-gun (KR); Nam Ho You, Wanju-gun (KR); Jungwon Kim, Wanju-gun (KR); Jun Yeon Hwang, Wanju-gun (KR); Nam Dong Kim, Wanju-gun (KR); Dae-Yoon Kim, Wanju-gun (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 965 days.

(21) Appl. No.: 17/980,845

(22) Filed: Nov. 4, 2022

(65) Prior Publication Data

US 2023/0167588 A1 Jun. 1, 2023

(30) Foreign Application Priority Data

Nov. 4, 2021 (KR) ........................ 10-2021-0150701

(51) Int. Cl.
*D01F 9/24* (2006.01)
*C04B 35/532* (2006.01)
(Continued)

(52) U.S. Cl.
CPC .............. *D01F 9/24* (2013.01); *C04B 35/532* (2013.01); *D01F 1/10* (2013.01); *D01F 6/74* (2013.01);
(Continued)

(58) Field of Classification Search
CPC ..... D01F 9/24; D01F 1/10; D01F 6/74; D01F 1/09; D01F 8/10; D01F 9/21;
(Continued)

(56) References Cited

U.S. PATENT DOCUMENTS 10,011,694 B2 7/2018 Chan et al.
2014/0162063 A1* 6/2014 Dzenis ................ D01D 5/0092 428/401
(Continued)

FOREIGN PATENT DOCUMENTS

CN 105696116 6/2016
CN 107059161 8/2017
(Continued)

OTHER PUBLICATIONS

Machine translation; CN 107059161A; obtained Jan. 22, 2026, espacenet.com (Year: 2026).*
(Continued)

*Primary Examiner* — Michael M. Robinson
(74) *Attorney, Agent, or Firm* — LEX IP MEISTER, PLLC

(57) ABSTRACT

The present invention relates to a method for manufacturing carbon composite fibers and carbon nanofibers, and more particularly, to a method for manufacturing carbon composite fiber with greatly improved specific tensile strength, specific modulus, electrical conductivity, and thermal conductivity.

11 Claims, 15 Drawing Sheets

(51) Int. Cl.
*D01F 1/10* (2006.01)
*D01F 6/74* (2006.01)

(52) U.S. Cl.
CPC .. *C04B 2235/5248* (2013.01); *D10B 2401/04* (2013.01); *D10B 2401/063* (2013.01)

(58) Field of Classification Search
CPC .......... C04B 35/532; C04B 2235/5248; D10B 2401/04; D10B 2401/063; D10B 2331/14; D10B 2401/061; D10B 2401/16; C01P 2006/10; C01P 2006/40; C01B 32/174; C01B 32/194; D01D 1/02
See application file for complete search history.

(56) References Cited

U.S. PATENT DOCUMENTS

| | | | | |
|---|---|---|---|---|
| 2014/0363669 | A1* | 12/2014 | Otto | C01B 32/168 252/502 |
| 2017/0030009 | A1* | 2/2017 | Kim | D04H 1/728 |
| 2017/0081788 | A1* | 3/2017 | Muramatsu | C09D 5/24 |
| 2022/0227631 | A1 | 7/2022 | Ku et al. | |

FOREIGN PATENT DOCUMENTS

| | | |
|---|---|---|
| CN | 107304490 | 10/2017 |
| CN | 110468465 | 11/2019 |
| JP | 2005-502792 | 1/2005 |
| KR | 10-2014-0059843 | 5/2014 |
| KR | 10-1853310 | 4/2018 |
| KR | 10-2021-0044588 | 4/2021 |
| KR | 10-2257811 | 5/2021 |
| WO | 2014-100213 | 6/2014 |

OTHER PUBLICATIONS

Kim, Seo Gyun, et al. "Ultrahigh strength and modulus of polyimide-carbon nanotube based carbon and graphitic fibers with superior electrical and thermal conductivities for advanced composite applications." Composites Part B: Engineering 247 (Oct. 7, 2022): 110342. pp. 1-9.

KIPO, A PCT Search Report & Written Opinion of PCT/KR2022/017252 dated Feb. 13, 2023.

Yin, Chaoqing, et al. "Large-scale fabrication of polyimide fibers containing functionalized multiwalled carbon nanotubes via wet spinning." Composites Part B: Engineering 58, 430-437, Nov. 9, 2013.

Xiao, Meng, et al. "The influence of chemical constitution on the structure and properties of polyimide fibre and their graphite fibre." Polymer 165 (Feb. 2019): 142-151.

Murakami, Mutsuaki, et al. "Fabrication of high quality and large area graphite thin films by pyrolysis and graphitization of polyimides." Carbon 145 (Apr. 2019): 23-30.

Seo Gyun Kim et al., "Ultrahigh strength and modulus of polyimide-carbon nanotube based carbon and graphitic fibers with superior electrical and thermal conductivities for advanced composite applications", Composites Part B 247 (2022) 110342, Oct. 7, 2022.

* cited by examiner

METHOD OF PREPARING CARBON COMPOSITE FIBER AND CARBON COMPOSITE FIBER

CROSS-REFERENCE TO RELATED APPLICATION

This application claims priority to and the benefit of Korean Patent Application No. 10-2021-0150701 filed in the Korean Intellectual Property Office on Nov. 4, 2021, and Korean Patent Application No. filed in the Korean Intellectual Property Office on, the entire contents of which are incorporated herein by reference.

BACKGROUND OF THE INVENTION

(a) Field of the Invention

The present invention relates to a method for manufacturing carbon composite fibers and carbon nanofibers, and more particularly, to a method for manufacturing carbon composite fiber with greatly improved specific tensile strength, specific tensile modulus, electrical conductivity, and thermal conductivity.

(b) Description of the Related Art

Carbon nanofiber refers to a fibrous material containing 90% or more of carbon, and its application fields vary according to its shape and microstructure.

These carbon fibers can be used to manufacture a polymer electrolyte fuel cell (PEMFC) electrode, a negative electrode material for a Li-ion secondary battery (LIB or LPB), an electric double layer supercapacitor (EDLC) electrode, and the like.

In addition, based on improved properties (high strength, high elasticity, high conductivity), it can be applied to space, aviation, and national defense fields.

Methods for manufacturing carbon nanofibers comprise a method of electrospinning carbon fiber precursors and manufacturing through a stabilization carbonization process, a method of manufacturing by vapor phase growth using a catalyst, and the like.

In the case of a method for manufacturing carbon nanofibers using a conventional catalyst, the amount of catalyst positioned in the reaction tube is limited during batch production, and the carbon source gas is not uniformly supplied to the catalysts arranged in a flat shape, resulting in uneven growth of carbon nanofibers.

Therefore, there is a need to mass-produce high-quality carbon nanofibers.

The above information disclosed in this Background section is only for enhancement of understanding of the background of the invention, and therefore it may contain information that does not form the prior art that is already known in this country to a person of ordinary skill in the art.

SUMMARY OF THE INVENTION

An object of the present invention is to provide a method for manufacturing carbon composite fiber with significantly improved Specific tensile strength, specific tensile modulus, electrical conductivity and thermal conductivity and so on.

The object of the present invention is not limited to the object mentioned above. The objects of the present invention will become more apparent from the following description, and will be realized by means and combinations thereof set forth in the claims.

The above objects, other objects, features and advantages of the present invention will be easily understood through the following preferred embodiments in conjunction with the accompanying drawings. However, the present invention is not limited to the embodiments described herein and may be embodied in other forms. Rather, the embodiments introduced herein are provided so that the disclosed content will be thorough and complete and the spirit of the present invention will be sufficiently conveyed to those skilled in the art.

Like reference numerals have been used for like elements throughout the description of each figure. In the accompanying drawings, the dimensions of the structures are shown enlarged than actual for clarity of the present invention. Terms such as first and second may be used to describe various components, but the components should not be limited by the terms. These terms are only used for the purpose of distinguishing one component from another. For example, a first element may be termed a second element, and similarly, a second element may be termed a first element, without departing from the scope of the present invention. Singular expressions include plural expressions unless the context clearly dictates otherwise.

In this specification, terms such as "comprise", "include", or "have" are intended to indicate that the feature, number, step, operation, component, part, or combination thereof described in the specification exist, but it should be understood that it does not preclude the possibility of the presence or addition of one or more other features, number, step, operation, component, part, or combination thereof. In addition, when a part such as a layer, film, region, plate, etc. is said to be "on" another part, this includes not only the case where it is "directly on" the other part, but also the case where there is another part in the middle. Conversely, when a part such as a layer, film, region, plate, etc. is said to be "under" another part, this includes not only the case where it is "directly under" the other part, but also the case where there is another part in between.

Unless otherwise specified, all numbers, values and/or expressions expressing quantities of ingredients, reaction conditions, polymer compositions and formulations used herein, should be understood to be qualified in all cases by the term "about" as these numbers are essentially approximations that reflect, among other things, the various uncertainties of measurement that arise from obtaining these values. In addition, when numerical ranges are disclosed herein, such ranges are contiguous and include all values from the minimum value of such range to the maximum value inclusive, unless otherwise indicated. Furthermore, where such a range refers to an integer, all integers from the minimum value to the maximum value inclusive are included unless otherwise indicated.

FIG. 1 shows a method for manufacturing composite fiber according to the present invention. Referring to this, the manufacturing method may comprises preparing a spinning dope by dispersing carbon nanomaterials and polyamic acid in super acid (S10), spinning the spinning dope to obtain a preliminary fiber (S20) and imidizing the preliminary fiber to obtain a polyimide composite fiber (S30).

The manufacturing method may further comprise carbonizing or graphitizing the polyimide composite fibers (S40).

In the present invention, carbon composite fiber may mean polyimide composite fiber, carbon fiber, or graphite fiber.

The polyimide composite fiber may mean a fiber in which polyimide and carbon nanomaterials are composited, wherein the carbon fiber refers to a fiber in which the polyimide composite fiber is heat-treated at a series temperature and its components are carbonized, wherein the graphite fiber may refer to a fiber in which the polyimide composite fiber is heat-treated at a series of temperatures and its components are graphitized.

The carbon nanomaterial is a component that serves as a kind of filler.

The carbon nanomaterial may comprise at least one selected from the group consisting of carbon nanotube (CNT), carbon fiber (CF), graphene, graphene nanoribbon, and combinations thereof.

The carbon nanomaterial may be oxidized. This is to increase the dispersibility of the carbon nanomaterial in the spinning dope. Specifically, the carbon nanomaterial may be oxidized by heat treatment at 400° C. to 700° C. for about 10 minutes to 8 hours in an oxygen atmosphere.

The polyamic acid may be prepared by reacting a diamine and a dianhydride compound. Specifically, the polyamic acid may comprise a compound having a structure dehydrated by a reaction between a diamine and a dianhydride compound. The diamine is not limited to a specific compound, including a form composed of an aromatic compound, and may comprise at least one selected from the group consisting of p-phenyl diamine (PDA), 4,4'-oxydianiline (ODA), p-methylenedianiline (MDA), and combinations thereof.

The dianhydride compound is in the form of a dianhydride composed of aromatic compounds and may comprise at least one selected from the group consisting of pyromellitic dianhydride (PMDA), biphenyltertracarboxylic dianhydride (BPDA), and combinations thereof.

The present invention is characterized by dispersing the carbon nanomaterial and polyamic acid in super acid. That is, the present invention uses super acid as a solvent for spinning dope. Along with this, as mentioned above, by using the oxidized carbon nanomaterial, carbon composite fibers can be produced without problems such as dispersibility and non-expression of physical properties of the carbon nanomaterial even when the carbon nanomaterial is added in a significantly larger amount than in the prior art in the spinning dope.

The super acid may comprise at least one selected from the group consisting of chlorosulfonic acid, sulfuric acid, fuming sulfuric acid, fluorosulfonic acid, trifluoroacetic acid, trifluoromethanesulfonic acid, fluoroantimonic acid, carboranic acid, and combinations thereof.

The spinning dope may comprise the carbon nanomaterial and the polyamic acid in a mass ratio of 95:5 to 10:90, 90:10 to 20:80, or 90:10 to 60:40. When the mass ratio of the carbon nanomaterial exceeds 95, the content of the polyamic acid is relatively low, so the effect of composite may be small. If the mass ratio of the carbon nanomaterial is less than 5, the degree of improvement in Specific tensile strength, specific tensile modulus, electrical conductivity, thermal conductivity, etc. of the carbon composite fiber may be insignificant.

Concentrations of the carbon nanomaterial and the polyamic acid in the spinning dope may be 1 mg/ml to 100 mg/ml. When the concentration falls within the above range, the spinning dope may be smoothly spun.

The manufacturing method may further comprise pre-stirring the spinning dope before spinning the spinning dope. Specifically, after the spinning dope was first strongly stirred for 5 to 20 minutes at 1,000 RPM to 2,000 RPM using a Thinky mixer, and then continuously secondary stirring may be continuously performed using a magnetic stirrer or the like for about 1 to 7 days.

The spinning method of the spinning dope is not particularly limited, and for example, preliminary fibers may be obtained by spinning through wet spinning. The spinning dope may be directly spun into the coagulation solvent through a spinneret immersed in the coagulation solvent. While the ejected single filament fibers or multi-fibers pass through a coagulation bath having a length of about 10 cm to 100 cm, solidification by diffusion of the solvent proceeds to obtain filament-like preliminary fiber. The coagulation solvent may comprise at least one selected from the group consisting of acetone, diethyl ether, dichloromethane, dimethyl sulfoxide, and combinations thereof.

The preliminary fiber may be stretched. Specifically, the filament-like preliminary fiber that have passed through the coagulation bath may be stretched while passing through a hot stretching furnace. During the spinning step, the carbon material in the preliminary fiber may be oriented in the axial direction of the preliminary fiber due to the tension with which the preliminary fiber is wound on a winding roller or the like. In addition, as the preliminary fiber pass through the coagulation bath, the filaments are collected and densified, and solidified in this state to obtain preliminary fiber. The degree of orientation and density of the carbon material in the preliminary fiber may be adjusted through the ratio of the spinneret discharge speed and the rotational speed of the take-up roller (spin-draw ratio), that is, the tension applied to the preliminary fiber. The higher the spin-draw ratio, the higher the degree of orientation and density.

The preliminary fiber may be stretched at a stretch ratio of 1.0 to 3.0. When the stretch ratio falls within the above range, carbon composite fiber having excellent specific tensile strength and specific tensile modulus may be obtained.

After stretching, the preliminary fiber may be washed with a solvent such as acetone or water and dried.

A polyimide composite fiber may be obtained by imidizing the preliminary fiber. The polyimide composite fiber may be one in which carbon nanomaterial oriented in an axial direction on the fiber is dispersed in a polyimide resin formed by polymerization of the polyamic acid.

The imidization method of the preliminary fiber is not particularly limited, and any method may be used as long as it is commonly used in the technical field to which the present invention belongs. For example, the preliminary fiber may be imidized by heat treatment at 200° C. to 450° C.

Carbon fiber may be obtained by carbonizing the polyimide composite fiber. The polyimide composite fiber may be carbonized by heat treatment at 500° C. or higher, or 500° C. to 1,700° C. in an inert gas atmosphere.

Meanwhile, graphite fiber may be obtained by graphitizing the polyimide composite fiber. The polyimide composite fiber may be graphitized by heat treatment at 1,700° C. to 3,300° C. in an inert gas atmosphere.

When the polyimide composite fiber is heat-treated in the above temperature range, the diameter of 5% by weight or more of the carbon nanomaterials among the carbon nanomaterials comprised therein increases. As the carbonization temperature or graphitization temperature increases, the degree of increase in the diameter increases. In addition, in the process of carbonization or graphitization, carbon nanomaterials are aggregated, and Van der Waals force or chemical crosslinking is performed to obtain high-density carbon fiber or graphite fiber. As a result, the specific tensile strength, specific tensile modulus, thermal conductivity, etc. of carbon fiber or graphite fiber may be greatly improved.

The carbonization time or graphitization time of the polyimide composite fiber is not particularly limited and may vary depending on temperature conditions. For example, it may be carbonized for 1 minute to 60 minutes after reaching the final temperature.

Carbonization or graphitization of the polyimide composite fiber may be performed in a batch or continuous manner in a conventional heating furnace.

Carbonization or graphitization of the polyimide composite fiber may be performed using various devices such as Joule heating with a very fast processing time and microwave processing with easy post-processing. In addition, tension may be applied to the polyimide composite fiber during the carbonization or graphitization.

The inert gas atmosphere may be formed using nitrogen, argon or helium gas.

The carbon composite fiber obtained by the above method may be a density of 1.0 $g/cm^3$ to 2.2 $g/cm^3$, and the specific tensile strength may be 0.5N/Tex to 5N/Tex, and the specific tensile modulus may be 100N/Tex to 600N/Tex, and the thermal conductivity may be 100 W/mk to 1,000 W/mk.

The carbon composite fiber has functionality that can be usefully applied to next-generation new technologies and new materials such as wearable devices, electricity, electronics, and bio fields, as well as structural composite materials.

In one embodiment of the present invention, a Method of manufacturing carbon composite fiber is provided, comprising: preparing a spinning dope by dispersing the carbon nanomaterial and the base substrate in super acid; obtaining preliminary fiber by spinning the spinning dope; and carbonizing the preliminary fiber by heat treatment; wherein the base substrate is a polymer-based substrate; or a petroleum-based or coal-based base material.

In the present invention, the carbon composite fiber may mean a polymer composite fiber, carbon fiber or graphite fiber.

The carbon composite fiber may mean a fiber in which a polymer or a petroleum-based/coal-based carbon material and a carbon nanomaterial are combined.

In addition, the carbon fiber may refer to a fiber in which the composite fiber of the polymer or petroleum-based/coal-based carbon material is heat-treated at a series of temperatures and the components are carbonized.

The graphite fiber may mean a fiber in which the composite fiber of the polymer or petroleum-based/coal-based carbon material is heat-treated at a series of temperatures to graphitize its components.

The carbon nanomaterial is a component that serves as a kind of filler.

In the polymer-based substrate, the polymer may be polyamic acid, thermoplastic polyimide, polyetherimide (PEI), polyacrylonitrile (PAN), polyphenylene sulfide (PPS), or a combination thereof.

The petroleum-based or coal-derived substrate may be pitch, coal tar, carbon black, or a combination thereof.

The carbon composite fiber prepared may have an elastic modulus of 100 GPa or more, and a tensile strength of 1.5 GPa or more.

The manufactured carbon composite fiber may satisfy Equation 1 below.

$$280 \leq a \leq 600 \quad \text{[Equation 1]}$$

$$a = \{\text{Specific Tensile Modulus (N/tex)} * \text{Specific Tensile Strength (N/tex)}\} / \text{Density (g/cm}^3\text{)}$$

The polymer-based substrate may be polyetherimide (PEI), wherein the content of polyetherimide is 10 to 40% by weight based on 100% by weight of the total spinning dope.

The polymer-based substrate may be polyimide, wherein the content of polyimide is 10 to 30% by weight based on 100% by weight of the total spinning dope.

The polymer-based substrate is polyphenylene sulfide (PPS), wherein the content of polyphenylene sulfide (PPS) is 10 to 30% by weight based on 100% by weight of the total spinning dope.

The polymer-based substrate is polyacrylonitrile (PAN), wherein the content of polyacrylonitrile (PAN) may be 5 to 20% by weight based on 100% by weight of the total spinning dope.

The petroleum-based or coal-derived substrate is pitch, wherein the pitch content may be 5 to 30% by weight based on 100% by weight of the total spinning dope.

The carbon nanomaterial may comprise at least one selected from the group consisting of carbon nanotubes (CNT), graphene, graphene nanoribbons, and combinations thereof.

The carbon nanomaterial may be oxidized. This is to increase the dispersibility of the carbon nanomaterial in the spinning dope. Specifically, the carbon nanomaterial may be oxidized by heat treatment at 400° C. to 700° C. for about 10 minutes to 8 hours in an oxygen atmosphere.

One embodiment of the present invention is the carbon nanomaterial and polymer-based substrate; or, it is characterized by dispersing a petroleum-based or coal-based base material in super acid.

That is, in one embodiment of the present invention, super acid is used as a solvent for spinning dope. Along with this, as mentioned above, by using the oxidized carbon nanomaterial, carbon composite fibers can be produced without problems such as dispersibility and non-expression of physical properties of the carbon nanomaterial even when the carbon nanomaterial is added in a significantly larger amount than in the prior art in the spinning dope.

The super acid may comprise at least one selected from the group consisting of chlorosulfonic acid, sulfuric acid, fuming sulfuric acid, fluorosulfonic acid, trifluoroacetic acid, trifluoromethanesulfonic acid, fluoroantimonic acid, carboranic acid, and combinations thereof.

The spinning dope may comprise the carbon nanomaterial and polymer-based substrate; or a petroleum-based or coal-based base material in a mass ratio of 98:2 to 10:90 (Carbon nanomaterials: polymer-based material or petroleum-based or coal-based base material), or 90:10 to 20:80, or 90:10 to 40:60.

When the mass ratio of the carbon nanomaterial exceeds 98, the content of the polymer-based substrate; or, a petroleum-based or coal-based base material is relatively low, so the effect of composite may be small. If the mass ratio of the carbon nanomaterial is less than 10, the degree of improvement in specific tensile strength, specific tensile modulus, electrical conductivity, thermal conductivity, etc. of the carbon composite fiber may be insignificant.

Concentrations of the carbon nanomaterial and polymer-based substrate or, a petroleum-based or coal-based base material in the spinning dope may be 1 mg/ml to 100 mg/ml. When the concentration falls within the above range, the spinning dope may be smoothly spun.

The manufacturing method may further comprise pre-stirring the spinning dope before spinning the spinning dope. Specifically, after the spinning dope was first strongly stirred for 5 to 20 minutes at 1,000 RPM to 2,000 RPM using a Thinky mixer, and then continuously secondary stirring may be continuously performed using a magnetic stirrer or the like for about 1 to 7 days.

The spinning method of the spinning dope is not particularly limited, and for example, preliminary fibers may be obtained by spinning through wet spinning. The spinning dope may be directly spun into the coagulation solvent through a spinneret immersed in the coagulation solvent.

While the ejected single filament fibers or multi-fibers pass through a coagulation bath having a length of about 10 cm to 100 cm, solidification by diffusion of the solvent proceeds to obtain filament-like preliminary fiber. The coagulation solvent may comprise at least one selected from the group consisting of acetone, diethyl ether, dichloromethane, dimethyl sulfoxide, and combinations thereof.

The preliminary fiber may be stretched. Specifically, the filament-like preliminary fiber that have passed through the coagulation bath may be stretched while passing through a hot stretching furnace.

During the spinning step, the carbon material in the preliminary fiber may be oriented in the axial direction of the preliminary fiber due to the tension with which the preliminary fiber is wound on a winding roller or the like.

In addition, as the preliminary fiber pass through the coagulation bath, the filaments are collected and densified, and solidified in this state to obtain preliminary fiber. The degree of orientation and density of the carbon material in the preliminary fiber may be adjusted through the ratio of the spinneret discharge speed and the rotational speed of the take-up roller (spin-draw ratio), that is, the tension applied to the preliminary fiber. The higher the spin-draw ratio, the higher the degree of orientation and density.

The preliminary fiber may be stretched at a stretch ratio of 1.0 to 3.0. When the stretch ratio falls within the above range, carbon composite fiber having excellent specific tensile strength and specific tensile modulus may be obtained.

After stretching, the preliminary fiber may be washed with a solvent such as acetone or water and dried.

Carbon fiber may be obtained by carbonizing the prepared carbon composite fiber. The carbon composite fiber may be carbonized by heat treatment at 500° C. or higher, or 500° C. to 1,700° C. in an inert gas atmosphere.

Meanwhile, graphite fiber may be obtained by graphitizing the carbonized carbon composite fiber. The carbon composite fiber may be graphitized by heat treatment at 1,700° C. to 3,300° C. in an inert gas atmosphere.

When the carbon composite fiber is heat-treated in the above temperature range, the diameter of 5% by weight or more of the carbon nanomaterial among the carbon nanomaterials comprised therein increases. As the carbonization temperature or graphitization temperature increases, the degree of increase in the diameter increases.

In addition, in the process of carbonization or graphitization, carbon nanomaterials are aggregated, and Van der Waals force or chemical crosslinking is performed to obtain high-density carbon fiber or graphite fiber.

As a result, the specific tensile strength, specific tensile modulus, thermal conductivity, etc. of carbon fiber or graphite fiber may be greatly improved.

The carbonization time or graphitization time of the carbon composite fiber is not particularly limited and may vary depending on temperature conditions. For example, it may be carbonized for 1 minute to 60 minutes after reaching the final temperature.

Carbonization or graphitization of the carbon composite fiber may be performed in a batch or continuous manner in a conventional heating furnace.

Carbonization or graphitization of the carbon composite fiber may be performed using various devices such as Joule heating with a very fast processing time and microwave processing with easy post-processing. In addition, tension may be applied to the carbon composite fiber during the carbonization or graphitization.

The inert gas atmosphere may be formed using nitrogen, argon or helium gas.

The carbon composite fiber obtained by the above method may be a density of 1.0 g/cm$^3$ to 2.2 g/cm$^3$, and the specific tensile strength may be 0.5N/Tex to 5N/Tex, and the specific tensile modulus may be 100N/Tex to 600N/Tex, and the thermal conductivity may be 100 W/mk to 1,000 W/mk.

The carbon composite fiber has functionality that can be usefully applied to next-generation new technologies and new materials such as wearable devices, electricity, electronics, and bio fields, as well as structural composite materials.

Another embodiment of the present invention provides a carbon composite fiber that satisfies Equation 1 below.

$$280 \leq a \leq 600 \qquad \text{[Equation 1]}$$

$$a = \{\text{Specific Tensile Modulus (N/tex)} * \text{Specific Tensile Strength (N/tex)}\} / \text{Density (g/cm}^3\text{)}$$

The value of a may satisfy $300 \leq a \leq 550$.

The carbon composite fiber is a form in which carbon nanomaterials are dispersed in a base substrate, and in a final fiber state, the base substrate is in a carbonized form, wherein the base substrate may be a polymer-based substrate; or a petroleum-based or coal-based base material.

The base substrate may be comprised in an amount of 2% by weight or more in the total carbon composite fiber.

The carbon composite fiber may have a tensile modulus of 100 GPa or more, and a tensile strength of 1.5 GPa or more.

According to the present invention, carbon composite fiber with greatly improved specific tensile strength, specific tensile modulus, electrical conductivity, and thermal conductivity may be obtained.

The effects of the present invention are not limited to the effects mentioned above. It should be understood that the effects of the present invention include all effects that can be inferred from the following description.

DETAILED DESCRIPTION OF THE EMBODIMENTS

Figure 1:
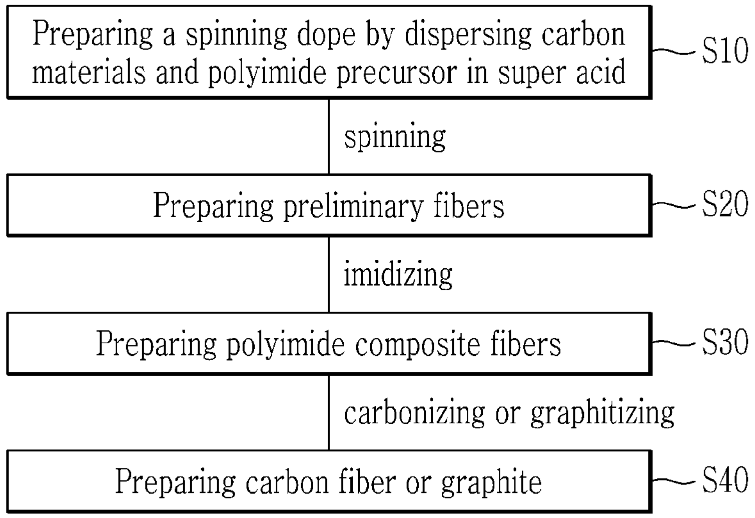
FIG. 1 shows a method for manufacturing a carbon composite fiber according to the present invention.

The following examples illustrate the present invention in more detail. However, the following example is only a preferred embodiment of the present invention, but the present invention is not limited to the following example.

Comparative Example 1: Polyimide Fiber

Polyimide varnish of Korea PI Advanced Materials was melted in NMP (N-Methyl-2-pyrrolidone) and spun using a syringe. Spinning was performed using a needle having a diameter of 0.18 mm, and fiber was spun with a stretch ratio of about 10.0 or more. The coagulation bath was used by mixing acetone and water at a ratio of 1:1, and the water washing bath was used while heating water at 80° C., and fibers were obtained through winding. Finally, in order to dry the water, the polyamic acid fibers were obtained by drying in a vacuum oven at 80° C. for more than one day. The polyamic acid fiber refer to non-imidized fiber.

The polyamic acid fibers were additionally imidized using a furnace. Since air present inside the heating furnace is oxidized during heat treatment, the vacuum was pulled to $10^{-3}$ torr before heat treatment, and nitrogen or argon gas was filled inside. Nitrogen was flowed into the furnace at a rate of 20 sccm. Heat treatment was performed by raising the temperature to about 450° C. at a heating rate of 3° C./min to 10° C./min. Specifically, after maintaining the temperature at a temperature of about 80° C. for 1 hour, at 140° C. for 1 hour, at 220° C. for 1 hour, and at 300° C. for 1 hour, the temperature was raised to about 450° C., and then the imidation was terminated. During all imidization processes, polyimide fibers were manufactured by naturally cooling in a state where nitrogen or argon gas was flowing.

Comparative Example 2: Carbon Fiber

The polyimide fibers of Comparative Example 1 were carbonized using a heating furnace. Since air present inside the heating furnace oxidization occurs during heat treatment, the vacuum was pulled up to $10^{-3}$ torr before carbonization and nitrogen or argon gas was filled inside. Nitrogen was flowed into the heating furnace at a rate of 20 sccm. The polyimide fibers were carbonized by raising the temperature to about 1200° C. at a heating rate of 3° C./min to 10° C./min. After carbonization was completed, carbon fibers were manufactured by naturally cooling in a state where nitrogen or argon gas was flowing.

Comparative Example 3: Graphite Fiber

Graphite fibers were manufactured by heat-treating the polyimide fibers of Comparative Example 1 in the same manner as in Comparative Example 3, except that the temperature was changed to 2700° C.

Example 1: Polyimide Composite Fiber

A spinning dope was prepared by mixing carbon nanotubes and polyamic acid (PAA) manufactured by Meijo, Japan at a mass ratio of 90:10, and adding chlorosulfonic acid (CSA) at a concentration of 8 mg/mL. The carbon nanotubes are a mixture of single wall carbon nanotubes (SWCNT) and double wall carbon nanotubes (DWCNT) in a mass ratio of 55:45. In order to increase the dispersibility of the carbon nanotubes, they were oxidized by heat treatment at about 400° C. for 6 hours. After stirring the spinning dope for more than one day, it was spun using a syringe. Specifically, a preliminary fiber was obtained by spinning at a stretch ratio of about 2.0 or more using a needle having a diameter of 0.26 mm. Both the coagulation bath and the washing bath used acetone. Washing was carried out for 2 hours and finally dried in a vacuum oven at 170° C. for more than one day to evaporate chlorosulfonic acid (CSA) inside.

The preliminary fiber was heat-treated by raising the temperature to about 450° C. at a heating rate of 3° C./min to 10° C./min. Specifically, after maintaining the temperature at a temperature of about 80° C. for 1 hour, at 140° C. for 1 hour, at 220° C. for 1 hour, and at 300° C. for 1 hour, the temperature was raised to about 450° C., and then imidized to obtain polyimide composite fibers.

Example 2: Polyimide Composite Fiber

Polyimide composite fibers were obtained in the same manner as in Example 1, except that the mass ratio of carbon nanotubes and polyamic acid was adjusted to 70:30.

Example 3: Polyimide Composite Fiber

Polyimide composite fibers were obtained in the same manner as in Example 1, except that the mass ratio of carbon nanotubes and polyamic acid was adjusted to 50:50.

Example 4: Polyimide Composite Fiber

Polyimide composite fibers were obtained in the same manner as in Example 1, except that the mass ratio of carbon nanotubes and polyamic acid was adjusted to 40:60.

Example 5 to Example 8: Carbon Fiber

Each of the polyimide composite fibers according to Examples 1 to 4 was carbonized in the same manner as in Comparative Example 3 to obtain carbon fibers. Specifically, since air present inside the heating furnace oxidization occurs during heat treatment, the vacuum was pulled up to $10^{-3}$ torr before carbonization and nitrogen or argon gas was filled inside. Nitrogen was flowed into the heating furnace at a rate of 20 sccm. Each of the polyimide composite fibers according to Examples 1 to 4 were carbonized by raising the temperature to about 1200° C. at a heating rate of 3° C./min to 10° C./min. After carbonization was completed, carbon fibers were manufactured by naturally cooling in a state where nitrogen or argon gas was flowing.

Example 9 to Example 12: Graphite Fiber

Graphite fibers were obtained by graphitizing each of the polyimide composite fibers according to Examples 1 to 4 in the same manner as in Comparative Example 4. Specifically, since air present inside the heating furnace oxidization occurs during heat treatment, the vacuum was pulled up to $10^{-3}$ torr before carbonization and nitrogen or argon gas was filled inside. Nitrogen was flowed into the heating furnace at a rate of 20 sccm. Each polyimide composite fiber according to Examples 1 to 4 was graphitized by raising the temperature to about 2700° C. at a heating rate of 3° C./min to 10° C./min. After completion of graphitization, graphite fibers were manufactured by naturally cooling in a state where nitrogen or argon gas was flowing.

Evaluation Example

The specific tensile strength, linear density, specific tensile modulus, electrical conductivity, and thermal conductivity of the carbon composite fibers of Comparative Examples 1 to 3 and Examples 1 to 12 were measured.

The above-described physical property measurement was performed using FAVIMAT+ (short fiber property measuring instrument). This equipment measures tensile strength (N) and linear density (tex) and calculates specific tensile strength (N/tex).

FAVIMAT may calculate the linear density (μ) using the formula of $$f = \frac{1}{2L}\sqrt{\frac{T}{\mu}}$$

using the natural frequency of the fiber. where f is the natural frequency [Hz], T is the tension [N], and L is the length of the fiber [km]. After measuring the linear density in this way, the tensile strength is measured through a tensile test. It is a device that can know the specific tensile strength by calculating the measured tensile strength and linear density.

Specific tensile strength (N/tex) is a value calculated using the linear density calculated in FAVIMAT and the tensile strength (Force, N) measured in a tensile test.

Specific tensile modulus (N/tex) shows the slope in the graph of the elongation and the tensile strength. The elongation refers to the maximum elongation until the fiber breaks through the tensile test of the fiber in FAVIMAT. The elongation is expressed in %. Usually, it represents the initial slope value and calculates and displays the section in which the strength constantly increases according to the elongation.

Electrical conductivity (S/cm) was calculated according to a formula by measuring resistance. The resistance was measured after applying silver paste to the composite fibers at 1 cm intervals. And the linear density measured by FAVIMAT was calculated according to cm/(4 Fiber Area).

The density was obtained by mixing two solvents having different densities and using a density gradient tube, which is a method of measuring the degree to which fibers are located by the difference in density in the solvent. The density gradient tube is a device that creates an environment with different densities within one solvent by mixing benzene and tetrabromomethane solvents in appropriate ratios. For the density, the difference in density was distinguished using beads for reference whose density was already known. After putting the composite fibers in the prepared solvent, the fibers were left for at least 6 hours so that they could be accurately positioned at the corresponding density, and then the location of the composite fibers was observed to measure the density.

Thermal conductivity was measured using the DC thermal bridge method and was performed in high vacuum (~$10^{-6}$ Torr). For the one-dimensional thermal conductivity equation, the thermal conductivity (k) may be obtained using $$\frac{d^2T(x)}{dx^2} + \frac{Q}{kA} = 0$$

equation. where x is the position of the sample at 0 [m], T(x) is the temperature at position x [K], Q is the heat generated by Joule heating [W], A is the cross-sectional area of the sample [$m^2$], k is the thermal conductivity of the sample [W $m^{-1}$ $K^{-1}$]. Using this equation, the average temperature rise of the sample may be rewritten as an equation $$\Delta T = \frac{QL}{12kA}.$$

where L is the length of the sample [m]. The thermal conductivity was measured in this way, and the current was measured using a Source-meter (source measuring device) and the voltage was measured using a Nanovoltmeter (nanovoltmeter) to measure the amount of heat generated. The length of the sample was measured with an optical microscope and a scanning electron microscope (SEM).

Figure 2:
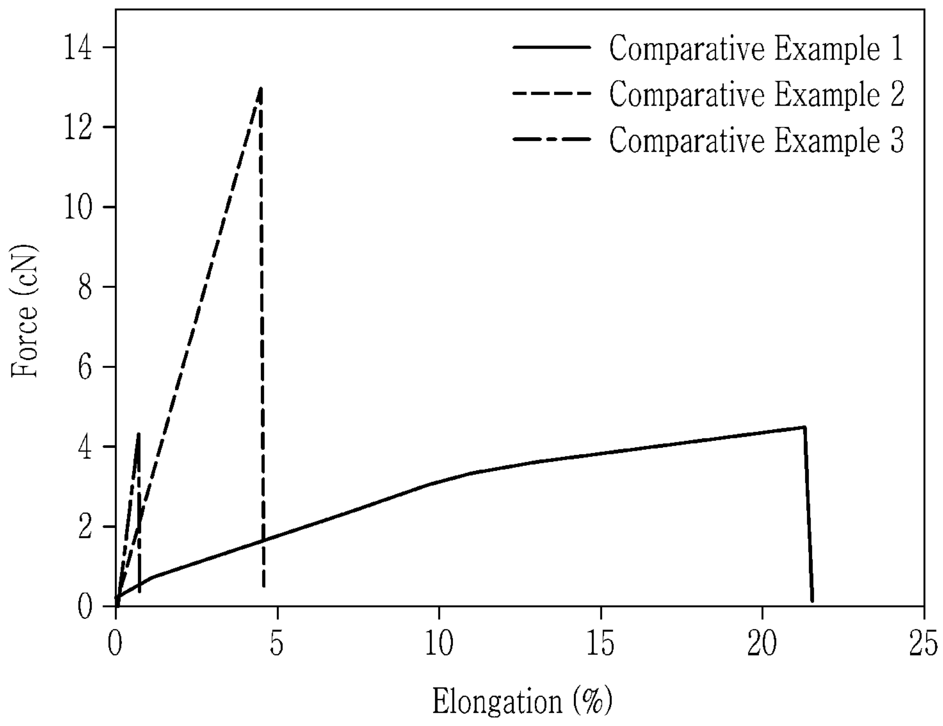
FIG. 2 is a graph of strength elongation change of fiber according to Comparative Examples 1 to 4.
Figure 3:
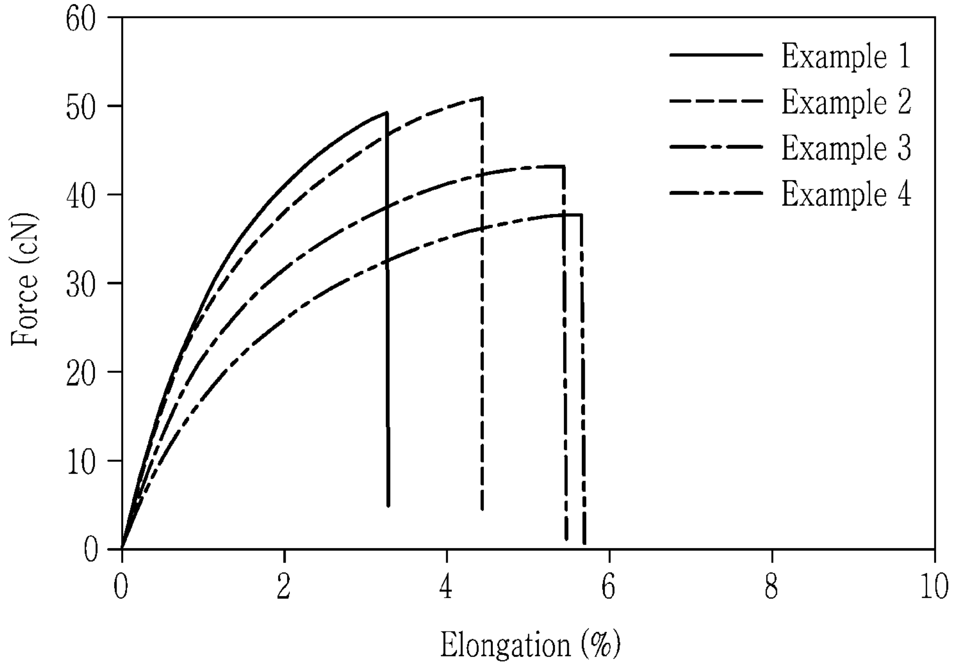
FIG. 3 is a graph showing changes in strength and elongation of polyimide composite fiber according to Examples 1 to 4.
Figure 4:
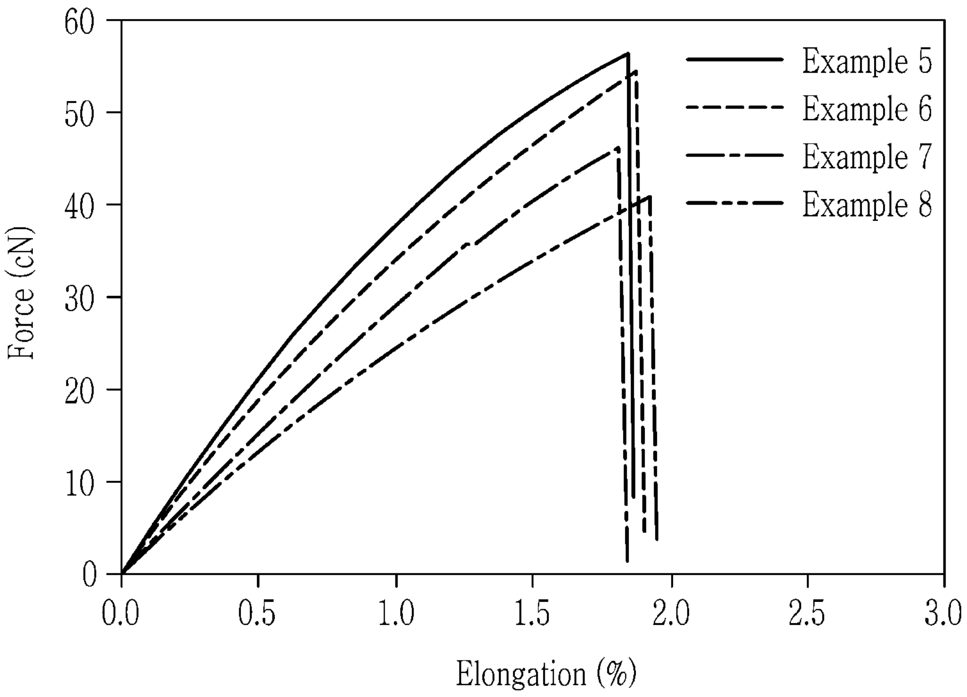
FIG. 4 is a graph of strength elongation change of carbon fibers according to Examples 5 to 8.
Figure 5:
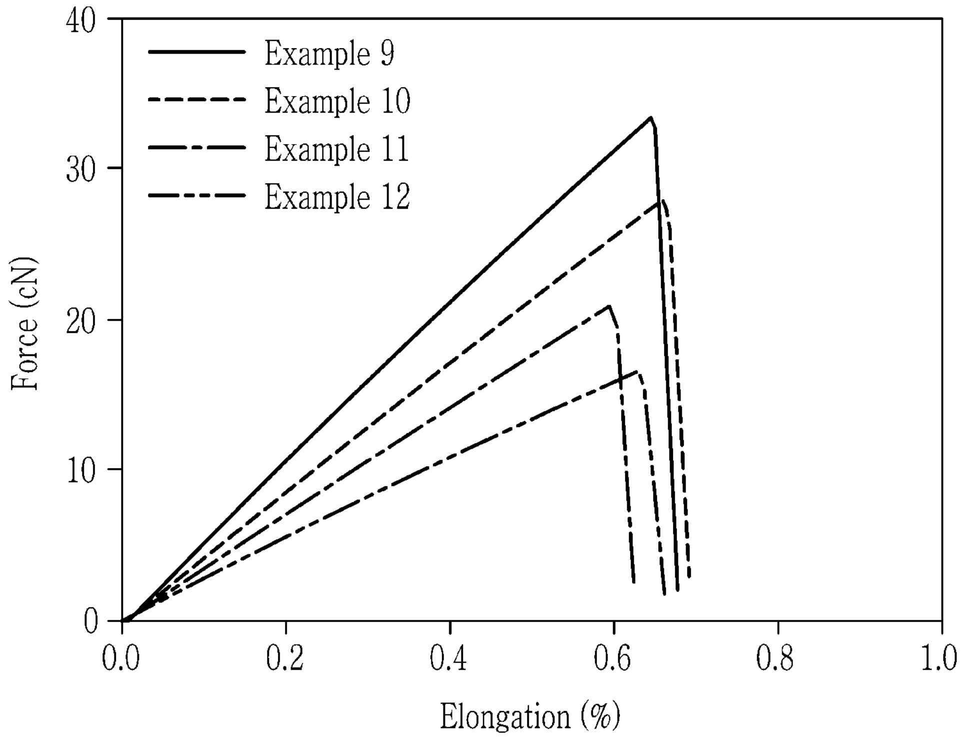
FIG. 5 is a graph of strength elongation change of graphite fiber according to Examples 9 to 12.
Figure 6:
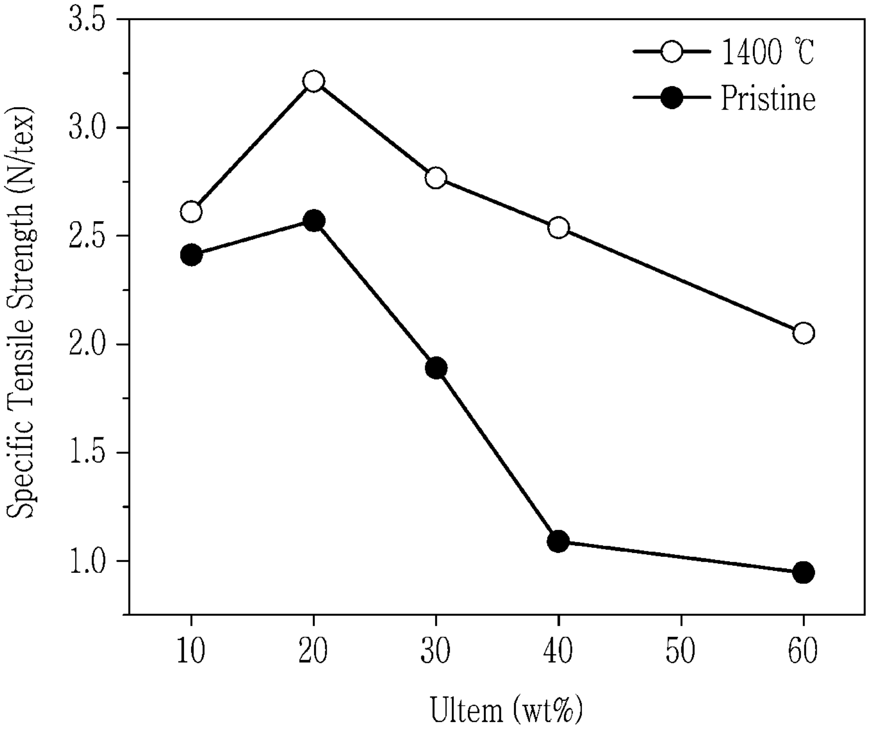
FIG. 6 is a graph showing the specific tensile strength according to the content of carbon nanofiber according to an embodiment of the present invention.
Figure 7:
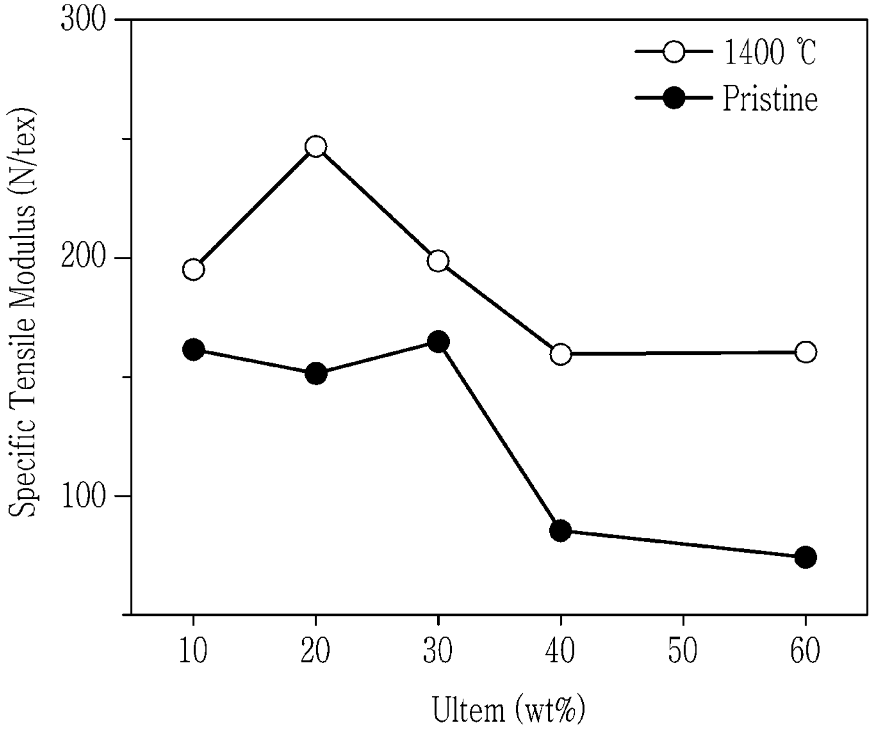
FIG. 7 is a graph showing the Specific Tensile modulus according to the content of carbon nanofiber according to an embodiment of the present invention.
Figure 8:
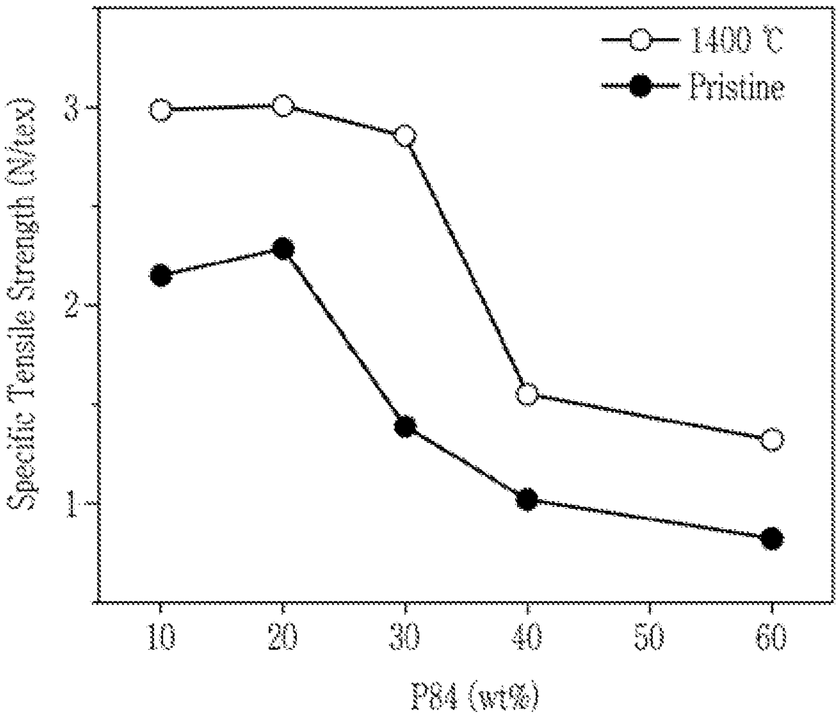
FIG. 8 is a graph showing the specific tensile strength according to the content of carbon nanofiber according to an embodiment of the present invention.
Figure 9:
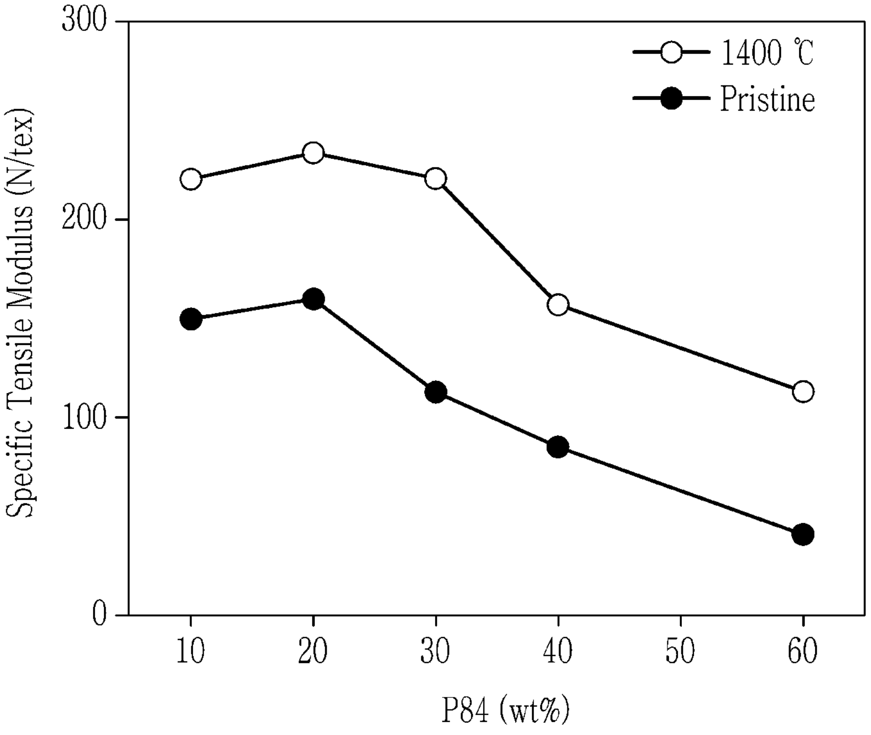
FIG. 9 is a graph showing the Specific Tensile modulus according to the content of carbon nanofiber according to an embodiment of the present invention.
Figure 10:
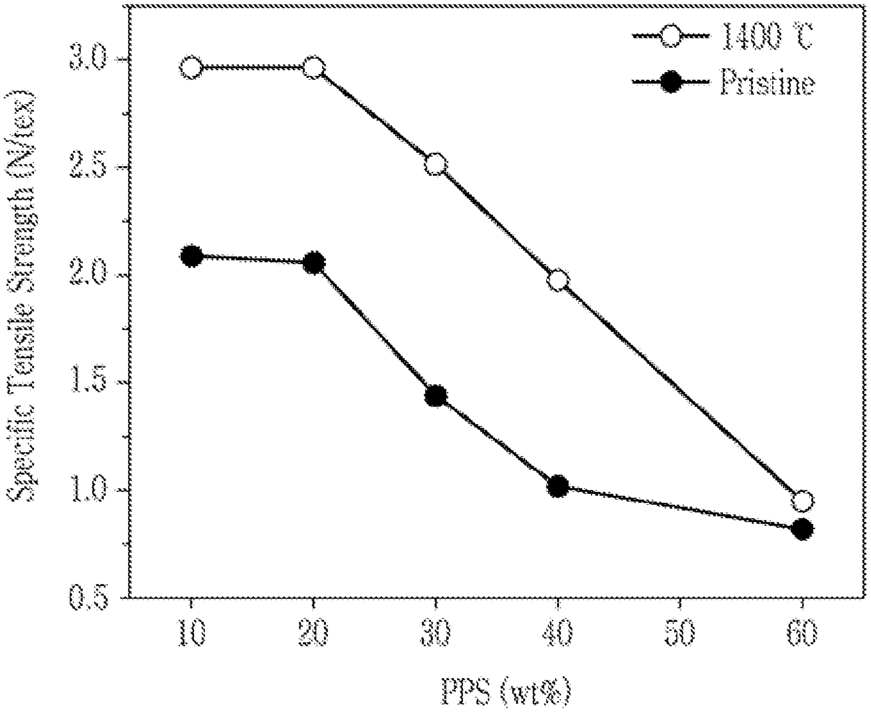
FIG. 10 is a graph showing the specific tensile strength according to the content of carbon nanofiber according to an embodiment of the present invention.
Figure 11:
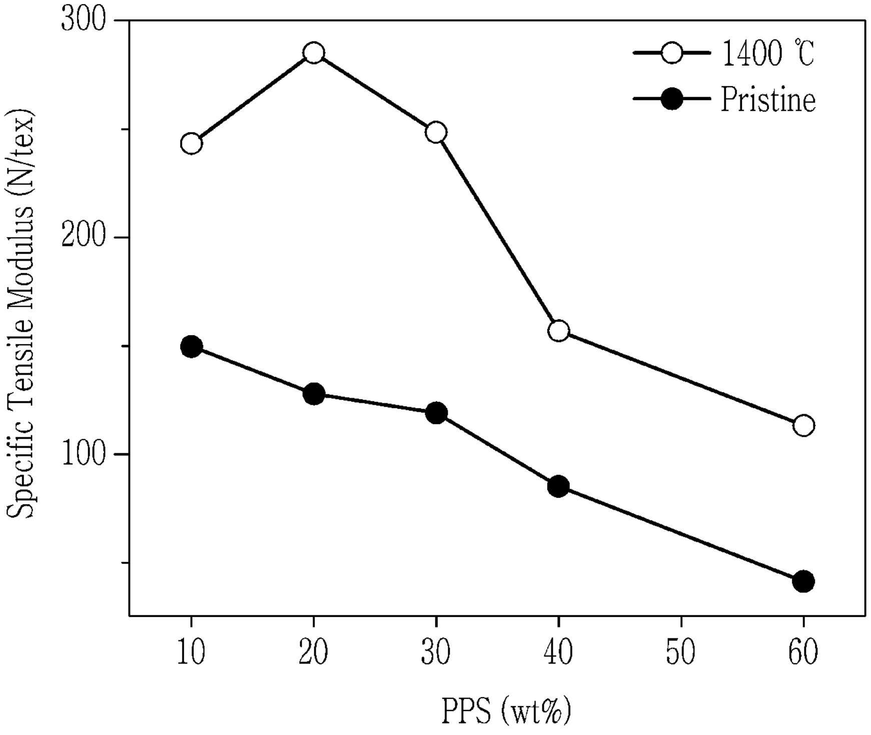
FIG. 11 is a graph showing the Specific Tensile modulus according to the content of carbon nanofiber according to an embodiment of the present invention.
Figure 12:
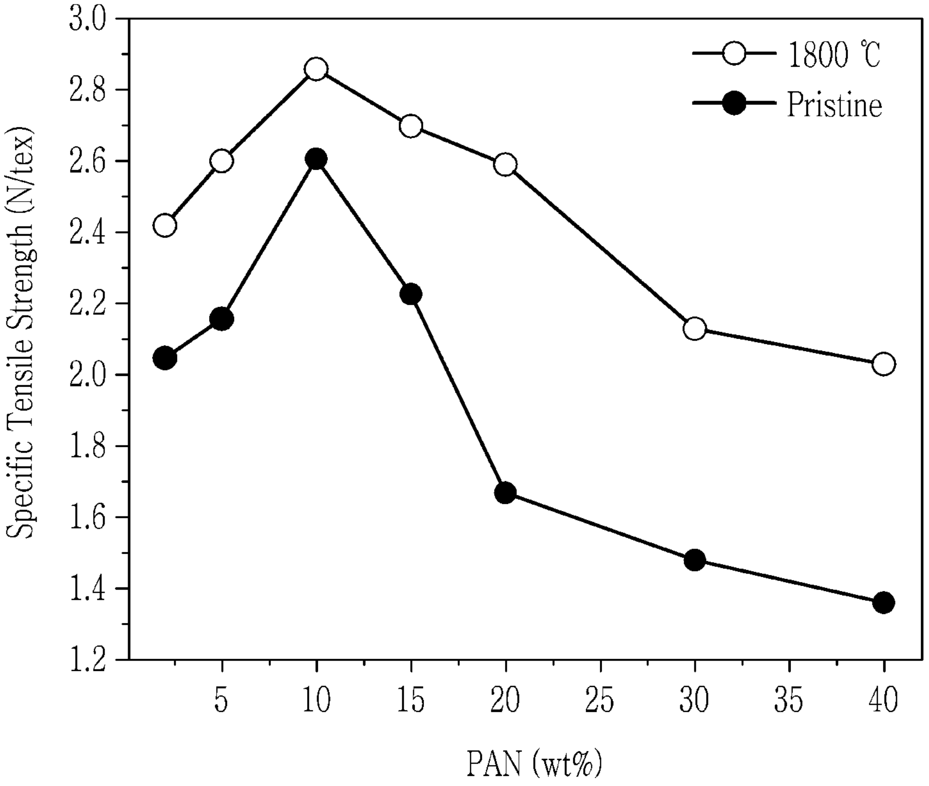
FIG. 12 is a graph showing the specific tensile strength according to the content of carbon nanofiber according to an embodiment of the present invention.
Figure 13:
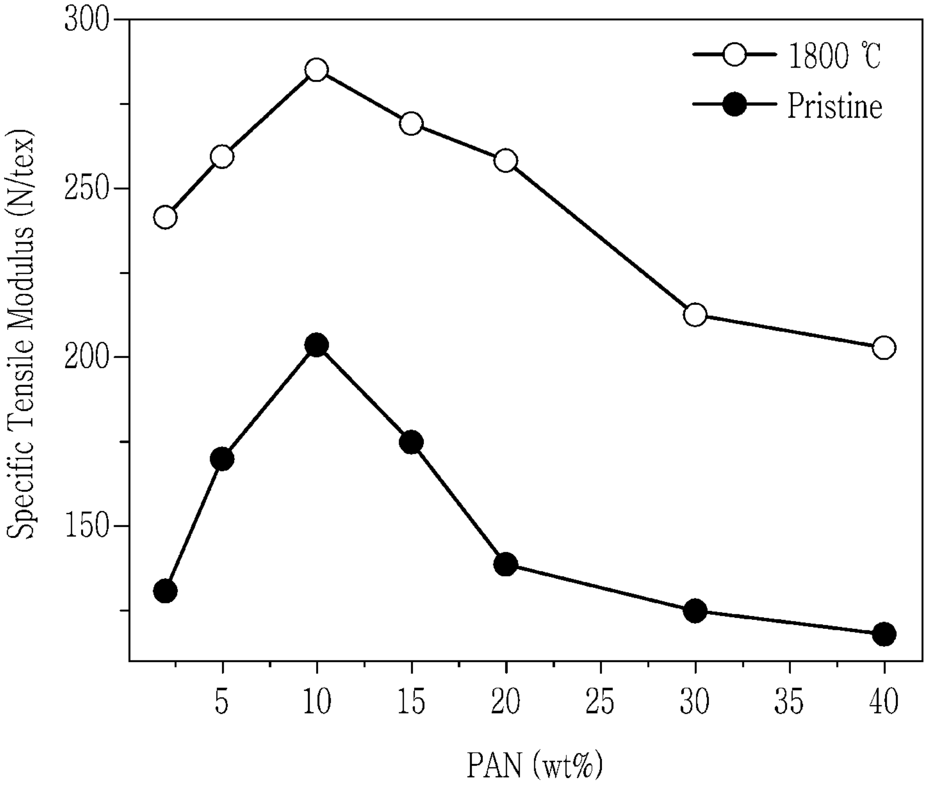
FIG. 13 is a graph showing the Specific Tensile modulus according to the content of carbon nanofiber according to an embodiment of the present invention.
Figure 14:
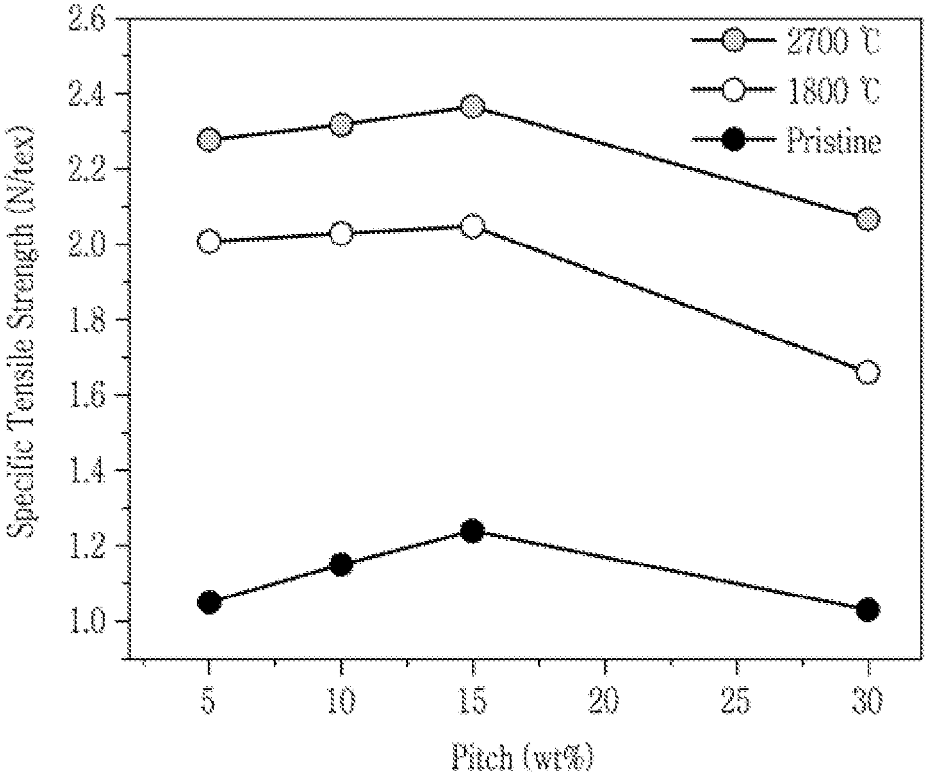
FIG. 14 is a graph showing the specific tensile strength according to the content of carbon nanofiber according to an embodiment of the present invention.
Figure 15:
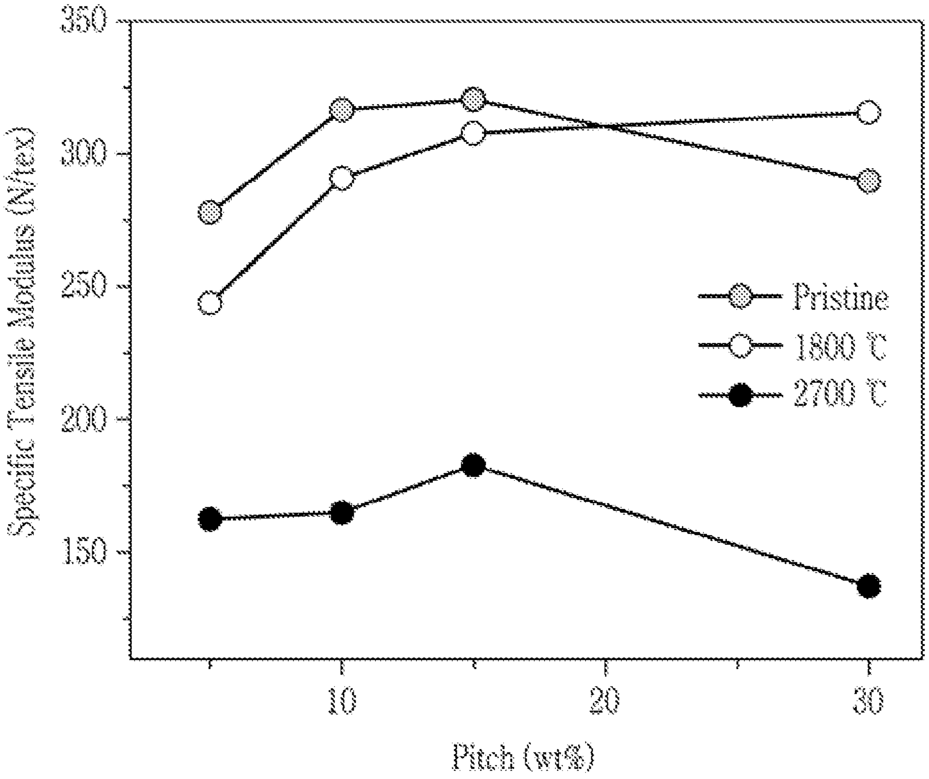
FIG. 15 is a graph showing the Specific Tensile modulus according to the content of carbon nanofiber according to an embodiment of the present invention.

FIG. 2 is a graph of strength elongation change of fiber according to Comparative Examples 1 to 4. FIG. 3 is a graph showing changes in strength and elongation of polyimide composite fiber according to Examples 1 to 4. FIG. 4 is a graph of strength elongation change of carbon fibers according to Examples 5 to 8. FIG. 5 is a graph of strength elongation change of graphite fiber according to Examples 9 to 12.

The specific tensile strength, linear density, specific tensile modulus, electrical conductivity and thermal conductivity of the fibers according to Comparative Examples 1 to 3 and the carbon composite fibers according to Examples 1 to 12 are shown in Table 1 below.

TABLE 1

| classified | component | carbonization-temperature [° C.] | Specific Tensile Strength [N/tex] | Specific Tensile modulus [N/tex] | Density [g/cm³] | Electrical Conductivity [S/cm] | Thermal Conductivity [W/mk] |
|---|---|---|---|---|---|---|---|
| Comparative Example1 | PI fiber | — | 0.44 | 6.60 | 1.7 | — | — |
| Comparative Example2 | carbonfiber | 1200 | 1.40 | 68.9 | 1.81 | 431 | 10 |
| Comparative Example3 | graphitefiber | 2700 | 0.49 | 126 | 1.97 | 1,481 | 142 |
| Example1 | PI compositefiber | — | 2.51 | 173 | 1.80 | 53,200 | — |
| Example2 | PI compositefiber | — | 2.70 | 223 | 1.78 | 57,500 | — |
| Example3 | PI compositefiber | — | 2.44 | 190 | 1.75 | 47,800 | — |
| Example4 | PI compositefiber | — | 1.99 | 169 | 1.75 | 37,900 | — |
| Example5 | carbonfiber | 1200 | 2.76 | 240 | 1.80 | 24,000 | — |
| Example6 | carbonfiber | 1200 | 3.07 | 245 | 1.81 | 24,400 | — |
| Example7 | carbonfiber | 1200 | 2.73 | 240 | 1.78 | 20,900 | — |
| Example8 | carbonfiber | 1200 | 1.84 | 194 | 1.78 | 17,000 | — |
| Example9 | graphitefiber | 2700 | 2.28 | 418 | 1.85 | 3,300 | 438 |
| Example10 | graphitefiber | 2700 | 2.26 | 375 | 1.87 | 3,400 | 441 |
| Example11 | graphitefiber | 2700 | 1.18 | 333 | 1.84 | 2,100 | 390 |
| Example12 | graphitefiber | 2700 | 0.91 | 226 | 1.80 | 1,600 | 335 |

Referring to Table 1, it may be confirmed that Examples 1 to 4 have much higher specific tensile strength, specific tensile modulus, and electrical conductivity than Comparative Examples 1 and 2.

Meanwhile, it may be confirmed that Examples 5 to 8 and Examples 9 to 12 also have improved specific tensile strength, specific tensile modulus, electrical conductivity, and thermal conductivity compared to Comparative Examples 3 and 4, respectively.

Through this, in implementing the polyimide-based carbon composite fiber as in the present invention, it may be confirmed that the application of high-capacity carbon nanomaterials such as carbon nanotubes may significantly increase the properties of the carbon composite fibers, such as specific tensile strength, specific tensile modulus, electrical conductivity, and thermal conductivity. As a method for manufacturing the above carbon composite fibers, the present invention has technical significance in presenting a specific method, such as using super acid as a solvent for spinning dope and using carbon nanomaterials oxidized under specific conditions.

Example: Carbon Composite Fiber

Carbon nanotubes from Meijo, Japan, and polymers or pitch were mixed in the mass ratio shown in the table below, and were added to chlorosulfonic acid (CSA) at a concentration of 8 mg/mL to prepare a spinning dope.

The carbon nanotubes are a mixture of single wall carbon nanotubes (SWCNTs) and double wall carbon nanotubes (DWCNTs) in a mass ratio of 55:45. In order to increase the dispersibility of the carbon nanotubes, they were oxidized by heat treatment at about 400° C. for 6 hours. After stirring the spinning dope for more than one day, it was spun using a syringe. Specifically, a preliminary fiber was obtained by spinning at a stretch ratio of about 2.0 or more using a needle having a diameter of 0.26 mm. Both the coagulation bath and the washing bath used acetone. Washing was carried out for 2 hours and finally dried in a vacuum oven at 170° C. for more than one day to evaporate chlorosulfonic acid (CSA) inside.

Carbon fibers were obtained by carbonizing each of the carbon composite fibers under the conditions shown in the table below. Specifically, since air present inside the heating furnace oxidization occurs during heat treatment, the vacuum was pulled up to $10^{-3}$ torr before carbonization and nitrogen or argon gas was filled inside. Nitrogen was flowed into the heating furnace at a rate of 20 sccm. Each carbon composite fiber was carbonized by raising the temperature to about 1,200-1,800° C. at a heating rate of 3° C./min to 10° C./min.

After carbonization was completed, carbon fibers were produced by naturally cooling in a state where nitrogen or argon gas was flowing.

The following Chemical formulas are structural formulas of repeating units and compounds of polymers used in Examples.

[Chemical Formula 1]

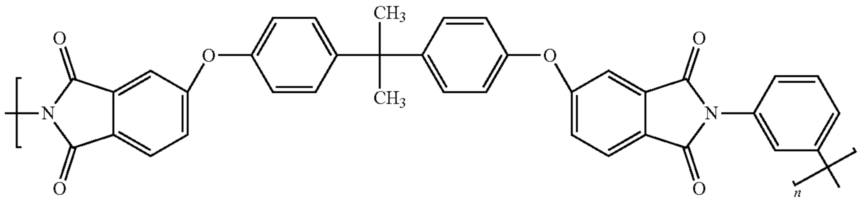

Ultem

-continued

[Chemical Formula 2]

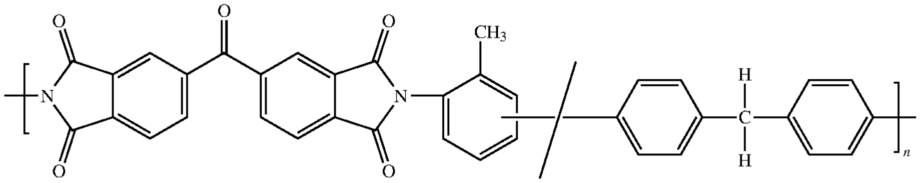

P84

[Chemical Formula 3]

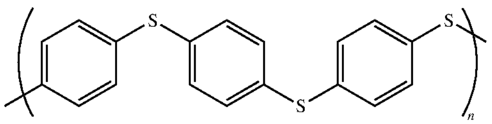

PPS

[Chemical Formula 4]

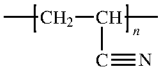

PAN

[Chemical Formula 5]

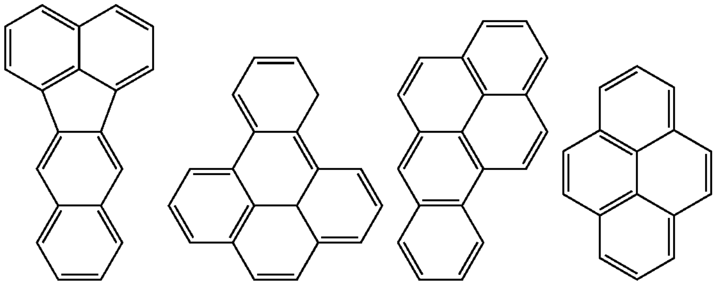

Pitch

Comparative Example: Polyimide Carbonization Fiber

Polyimide varnish from Korea PI Advanced Materials was melted in NMP (N-Methyl-2-pyrrolidone) and spun using a syringe. Spinning was performed using a needle having a diameter of 0.18 mm, and fibers were spun with a stretch ratio of about 10.0 or more. The coagulation bath was used by mixing acetone and water at a ratio of 1:1, and the washing bath was used while heating water at 80° C., and fibers were obtained through winding. Finally, in order to dry the water, the polyamic acid fibers were obtained by drying in a vacuum oven at 80° C. for more than one day. The polyamic acid fibers refer to non-imidized fibers.

The polyamic acid fibers were additionally imidized using a heating furnace. Since air present inside the heating furnace oxidization occurs during heat treatment, the vacuum was pulled up to $10^{-3}$ torr before heat treatment and nitrogen or argon gas was filled inside. Nitrogen was flowed into the heating furnace at a rate of 20 sccm. Heat treatment was performed by raising the temperature to about 450° C. at a heating rate of 3° C./min to 10° C./min. Specifically, after maintaining the temperature at a temperature of about 80° C. for 1 hour, at 140° C. for 1 hour, at 220° C. for 1 hour, and at 300° C. for 1 hour, the temperature was raised to about 450° C., and then the imidation was terminated. During all imidization processes, polyimide fibers were prepared by naturally cooling in a state where nitrogen or argon gas was flowing.

The polyimide fibers were carbonized using a heating furnace. Since air present inside the heating furnace oxidization occurs during heat treatment, the vacuum was pulled up to $10^{-3}$ torr before carbonization and nitrogen or argon gas was filled inside. Nitrogen was flowed into the heating furnace at a rate of 20 sccm. The polyimide fibers were carbonized by raising the temperature to about 1200° C. at a heating rate of 3° C./min to 10° C./min. After carbonization was completed, carbon fibers were produced by naturally cooling in a state where nitrogen or argon gas was flowing.

Evaluation Example

The properties of the carbon composite fibers of Examples and Comparative Examples were measured.

The above-described physical property measurement was performed using FAVIMAT+(short fiber property measuring instrument). This equipment measures tensile strength (N) and linear density (tex) and calculates specific tensile strength (N/tex).

FAVIMAT may calculate the linear density (μ) using the formula of $$f = \frac{1}{2L}\sqrt{\frac{T}{\mu}}$$

using the natural frequency of the fiber. where f is the natural frequency [Hz], T is the tension [N], and L is the length of the fiber [km]. After measuring the linear density in this way, the tensile strength is measured through a tensile test. It is a device that can know the specific tensile strength by calculating the measured tensile strength and linear density.

Specific tensile strength (N/tex) is a value calculated using the linear density calculated in FAVIMAT and the tensile strength (Force, N) measured in a tensile test.

Specific tensile modulus (N/tex) shows the slope in the graph of the elongation and the tensile strength. The elongation refers to the maximum elongation until the fiber breaks through the tensile test of the fiber in FAVIMAT. The elongation is expressed in %. Usually, it represents the initial slope value and calculates and displays the section in which the strength constantly increases according to the elongation.

The density was obtained by mixing two solvents having different densities and using a density gradient tube, which is a method of measuring the degree to which fibers are located by the difference in density in the solvent. The density gradient tube is a device that creates an environment with different densities within one solvent by mixing benzene and tetrabromomethane solvents in appropriate ratios. For the density, the difference in density was distinguished using beads for reference whose density was already known. After putting the composite fibers in the prepared solvent, the fibers were left for at least 6 hours so that they could be accurately positioned at the corresponding density, and then the location of the composite fibers was observed to measure the density.

The length of the sample was measured with an optical microscope and a scanning electron microscope (SEM).

TABLE 2

| wt % | Specific Tensile Strength (N/tex) | Tensile strength (Gpa) | Specific Tensile Modulus (N/tex) | Elastic modulus (Gpa) | Density (g/cm$^3$) | Specific Tensile Modulus * Specific Tensile Strength | (Specific Tensile Modulus * Specific Tensile Strength)/ Density |
|---|---|---|---|---|---|---|---|
| 10 | 2.61 | 4.78 | 196 | 358 | 1.83 | 512 | 280 |
| 20 | 3.22 | 5.76 | 247 | 443 | 1.79 | 795 | 444 |
| 30 | 2.77 | 4.82 | 199 | 346 | 1.74 | 551 | 317 |
| 40 | 2.54 | 4.33 | 160 | 272 | 1.71 | 406 | 238 |
| 60 | 2.05 | 3.51 | 161 | 275 | 1.71 | 330 | 193 |

* 1,400° C. carbonization CNT-UItem composite fiber

TABLE 3

| wt % | Specific Tensile Strength (N/tex) | Tensile strength (Gpa) | Specific Tensile Modulus (N/tex) | Elastic modulus (Gpa) | Density (g/cm$^3$) | Specific Tensile Modulus * Specific Tensile Strength | (Specific Tensile Modulus * Specific Tensile Strength)/ Density |
|---|---|---|---|---|---|---|---|
| 10 | 2.99 | 5.53 | 221 | 362 | 1.85 | 661 | 357 |
| 20 | 3.01 | 5.47 | 234 | 377 | 1.82 | 704 | 387 |
| 30 | 2.86 | 5.09 | 221 | 353 | 1.78 | 632 | 355 |
| 40 | 1.55 | 2.69 | 157 | 272 | 1.73 | 243 | 141 |
| 60 | 1.32 | 2.21 | 113 | 190 | 1.68 | 149 | 89 |

* 1,400° C. carbonization CNT-P84 composite fiber

TABLE 4

| wt % | Specific Tensile Strength (N/tex) | Tensile strength (Gpa) | Specific Tensile Modulus (N/tex) | Elastic modulus (Gpa) | Density (g/cm$^3$) | Specific Tensile Modulus * Specific Tensile Strength | (Specific Tensile Modulus * Specific Tensile Strength)/ Density |
|---|---|---|---|---|---|---|---|
| 10 | 2.97 | 5.05 | 244 | 415 | 1.7 | 725 | 426 |
| 20 | 2.97 | 4.78 | 286 | 460 | 1.61 | 849 | 528 |
| 30 | 2.52 | 5.07 | 249 | 408 | 1.64 | 627 | 383 |
| 40 | 1.98 | 3.19 | 157 | 253 | 1.61 | 311 | 193 |
| 60 | 0.95 | 1.52 | 113 | 181 | 1.6 | 107 | 67 |

* 1,400° C. carbonization CNT-PPS composite fiber

TABLE 5

| wt % | Specific Tensile Strength (N/tex) | Tensile strength (Gpa) | Specific Tensile Modulus (N/tex) | Elastic modulus (Gpa) | Density (g/cm$^3$) | Specific Tensile Modulus * Specific Tensile Strength | (Specific Tensile Modulus * Specific Tensile Strength)/ Density |
|---|---|---|---|---|---|---|---|
| 2 | 2.42 | 4.6 | 242 | 377 | 1.56 | 586 | 375 |
| 5 | 2.6 | 4.87 | 260 | 429 | 1.65 | 676 | 410 |
| 10 | 2.86 | 5.76 | 286 | 501 | 1.75 | 818 | 467 |
| 15 | 2.7 | 4.29 | 270 | 446 | 1.65 | 729 | 442 |
| 20 | 2.59 | 3.08 | 259 | 409 | 1.58 | 671 | 425 |
| 30 | 2.13 | 2.65 | 213 | 332 | 1.56 | 454 | 291 |
| 40 | 2.03 | 1.75 | 203 | 315 | 1.55 | 412 | 266 |

* 1,800° C. carbonization CNT-PAN composite fiber

TABLE 6

| wt % | Specific Tensile Strength (N/tex) | Tensile strength (Gpa) | Specific Tensile Modulus (N/tex) | Elastic modulus (Gpa) | Density (g/cm$^3$) | Specific Tensile Modulus * Specific Tensile Strength | (Specific Tensile Modulus * Specific Tensile Strength)/ Density |
|---|---|---|---|---|---|---|---|
| 5 | 2.01 | 3.48 | 244 | 422 | 1.73 | 490 | 283 |
| 10 | 2.03 | 3.55 | 291 | 509 | 1.75 | 591 | 338 |
| 15 | 2.05 | 3.55 | 308 | 533 | 1.73 | 631 | 365 |
| 30 | 1.66 | 2.65 | 316 | 506 | 1.6 | 525 | 328 |

* 1,800° C. carbonization CNT-pitch composite fiber

TABLE 7

| wt % | Specific Tensile Strength (N/tex) | Tensile strength (Gpa) | Specific Tensile Modulus (N/tex) | Elastic modulus (Gpa) | Density (g/cm$^3$) | Specific Tensile Modulus * Specific Tensile Strength | (Specific Tensile Modulus * Specific Tensile Strength)/ Density |
|---|---|---|---|---|---|---|---|
| N/A | 1.4 | — | 6.6 | — | 1.7 | 9 | 5 |

* 1,200° C. polyimide carbonization fiber

FIG. 6 to FIG. 15 are arranged data for the above-described embodiment of the present application.

Referring to Table 2 and the drawings, it may be confirmed that in the case of Ultem polymer, which is polyetherimide (PEI), the density decreases according to the content of the polymer, but the strength and the specific tensile strength are improved.

At this time, it may be confirmed that a certain content range (for example, 10-30% by weight) shows the best effect.

Referring to Table 3 and the drawings, it may be confirmed that the P84 polymer, which is a thermoplastic polyimide, exhibits the best properties in the range of 10-30% by weight.

Referring to Table 4 and the drawings, in the case of the PPS polymer, it may be confirmed that the range of 10-30% by weight shows the best properties.

Referring to Table 5 and the drawings, in the case of the PAN polymer, most of the generally excellent properties were shown, but up to 30% by weight showed particularly excellent properties.

Referring to Table 6 and the drawings, in the case of pitch, most of the generally excellent properties were shown. However, in the case of the 30% by weight condition, it may be confirmed that the specific tensile strength tended to be somewhat lowered.

As a comparative example, in the case of a fiber spun with a polymer other than a composite fiber, it showed a very low value in terms of specific tensile strength and a very low elastic modulus.

In order to select the appropriate specifications of these carbon composite fibers, the following Equation 1 was derived.

$$280 \leq a \leq 600 \quad \text{[Equation 1]}$$

$a$={Specific Tensile Modulus (N/tex)*Specific Tensile Strength (N/tex)}/Density (g/cm$^3$)

This is a value that may be compared with the degree of superiority of the specific tensile modulus and specific tensile strength for the density of the target product. The specific tensile modulus and the specific tensile strength may be improved simultaneously, but they did not show a tendency to be improved simultaneously at a predetermined ratio.

Based on the evaluated examples, carbon composite fibers satisfying the range of a value of 280 to 600 may be defined as having comprehensively improved characteristics.

More preferably, a value in the range of 300 to 550 may be required.

In the above, preferred implementations according to the present invention have been described with reference to drawings and embodiments, but this is only exemplary, those skilled in the art will understand that various modifications and equivalent other implementations are possible therefrom. Therefore, the scope of protection of the present invention should be defined by the appended claims.

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A method for manufacturing carbon composite fiber, comprising:

preparing a spinning dope by dispersing carbon nanomaterials and polyamic acid in super acid;

obtaining preliminary fibers by spinning the spinning dope; and imidizing the preliminary fiber to obtain polyimide composite fibers;

wherein the spinning dope comprises the carbon nanomaterial and the polyimide precursor in a mass ratio of 90:10 to 20:80, wherein the carbon nanomaterial is oxidized by heat treatment at 400° C. to 700° C. in an oxygen atmosphere.

2. The method of claim 1, wherein:

the carbon nanomaterial comprises at least one selected from the group consisting of carbon nanotubes (CNT), graphene, graphene nanoribbons, and combinations thereof.

3. The method of claim 1, wherein:

the polyamic acid is manufactured by reacting a diamine and a dianhydride compound, wherein the diamine is an aromatic ring compound and comprises at least one selected from the group consisting of p-phenyldiamine (PDA), 4,4'-oxydianiline (ODA), p-methylenedianiline (MDA), 3,3'-dihydroxy-4,4'-diaminobiphenyl (HAB) and combinations thereof, wherein the dianhydride compound is characterized in that it is an aromatic ring compound and comprises at least one selected from the group consisting of pyromellitic dianhydride (PMDA), biphenyltertracarboxylic dianhydride (BPDA), and combinations thereof.

4. The method of claim 1, wherein:

the super acid comprises at least one selected from the group consisting of chlorosulfonic acid, sulfuric acid, fuming sulfuric acid, fluorosulfonic acid, trifluoroacetic acid, trifluoromethanesulfonic acid, fluoroantimonic acid, carboranic acid, and combinations thereof.

5. The method of claim 1, comprising:

spinning the spinning dope in a coagulation solvent to obtain a preliminary fiber, wherein the coagulation solvent comprises at least one selected from the group consisting of acetone, diethylether, dichloromethane, dimethyl sulfoxide, and combinations thereof.

6. The method of claim 1, wherein:

the preliminary fiber is imidized by heat treatment at 200° C. to 450° C.

7. The method of claim 1, further comprising:

the step of carbonizing the polyimide composite fiber by heat treatment at 500° C. to 1700° C. in an inert gas atmosphere.

8. The method of claim 1, further comprising:

the step of graphitizing the polyimide fibers by heat treatment at 1700° C. to 3300° C. in an inert gas atmosphere.

9. The method of claim 1, wherein:

the carbon composite fiber has a density of 1.0 g/cm3 to 2.2 g/cm3, a specific tensile strength is of 0.5 N/Tex to 5 N/Tex, a specific tensile modulus of 100 N/Tex to 600 N/Tex, and a thermal conductivity of 100 W/(m·K) to 1,000 W/(m·K).

10. A method for manufacturing carbon composite fiber, comprising:

preparing a spinning dope by dispersing the carbon nanomaterial and the base substrate in super acid;

obtaining preliminary fibers by spinning the spinning dope; and carbonizing the preliminary fiber by heat treatment;

wherein the base substrate is a polymer-based substrate; and wherein the manufactured carbon composite fiber satisfies Equation 1 below:

$$280 \leq a \leq 600 \quad \text{[Equation 1]}$$

$a$={Specific Tensile Modulus (N/tex)*Specific Tensile Strength (N/tex)}/Density (g/cm$^3$), and wherein the polymer-based substrate is polyphenylene sulfide (PPS), wherein the content of polyphenylene sulfide (PPS) is 10 to 30% by weight based on 100% by weight of the total spinning dope.

11. The method of claim 10, wherein:

the elastic modulus of the manufactured carbon composite fiber is 100 GPa or more, and the tensile strength is 1.5 GPa or more.

* * * * *